US008910708B2

(12) United States Patent
Chatterji et al.

(10) Patent No.: US 8,910,708 B2
(45) Date of Patent: Dec. 16, 2014

(54) PUMICE-CONTAINING REMEDIAL COMPOSITIONS AND SYSTEMS FOR USE

(71) Applicant: Halliburton Energy Services, Inc., Houston, TX (US)

(72) Inventors: Jiten Chatterji, Duncan, OK (US); D. Chad Brenneis, Marlow, OK (US); James R. Benkley, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/143,660

(22) Filed: Dec. 30, 2013

(65) Prior Publication Data

US 2014/0318764 A1 Oct. 30, 2014

Related U.S. Application Data

(62) Division of application No. 13/873,905, filed on Apr. 30, 2013.

(51) Int. Cl.
*E21B 33/13* (2006.01)
*C09K 8/467* (2006.01)

(52) U.S. Cl.
CPC ............. *E21B 33/13* (2013.01); *C09K 8/467* (2013.01)
USPC ................. 166/177.4; 166/68.5; 166/90.1

(58) Field of Classification Search
CPC ........ C04B 38/10; C09K 8/473; E21B 33/13; E21B 49/08; E21B 43/261
See application file for complete search history.

(56) References Cited

U.S. PATENT DOCUMENTS

| | | |
|---|---|---|
| 5,238,064 A | 8/1993 | Dahl |
| 6,012,524 A | 1/2000 | Chatterji |
| 6,063,738 A | 5/2000 | Chatterji |
| 7,140,439 B2 | 11/2006 | Luke |
| 7,297,664 B2 | 11/2007 | Santra |
| 7,544,642 B2 | 6/2009 | Luke |
| 7,612,021 B2 | 11/2009 | Chatterji |
| 7,631,692 B2 | 12/2009 | Roddy |
| 7,743,828 B2 | 6/2010 | Roddy |
| 7,789,150 B2 | 9/2010 | Roddy |
| 7,810,566 B2 | 10/2010 | Caveny |
| 7,867,954 B2 | 1/2011 | Warrender |
| 8,261,827 B2 | 9/2012 | Roddy |
| 8,281,859 B2 | 10/2012 | Roddy |
| 8,297,357 B2 | 10/2012 | Brenneis |
| 8,307,899 B2 | 11/2012 | Brenneis |
| 8,318,642 B2 | 11/2012 | Roddy |
| 8,324,137 B2 | 12/2012 | Roddy |
| 8,327,939 B2 | 12/2012 | Roddy |
| 8,399,387 B2 | 3/2013 | Roddy |
| 8,403,045 B2 | 3/2013 | Brenneis |
| 8,434,553 B2 | 5/2013 | Brenneis |
| 2009/0105099 A1* | 4/2009 | Warrender et al. ........... 507/269 |
| 2010/0258312 A1 | 10/2010 | Brenneis et al. |
| 2012/0012315 A1* | 1/2012 | Woytowich et al. .......... 166/285 |
| 2012/0152539 A1 | 6/2012 | Karcher |
| 2012/0325119 A1 | 12/2012 | Brenneis |
| 2013/0061779 A1 | 3/2013 | Brenneis |

OTHER PUBLICATIONS

USPTO Office Action from U.S. Appl. No. 13/873,905 dated Jan. 22, 2014.
USPTO Office Action from U.S. Appl. No. 14/143,497, dated Apr. 8, 2014.
USPTO Office Action from U.S. Appl. No. 13/873,905 dated May 21, 2014.
Zetasizer Nano Range particle size analyzer, Malvern website product description, dated 2013, available at: http://www.malvern.com/labeng/products/zetasizer/zetasizer_nano.htm.
DS-200 and DS-325 grade Pumice, Hess Pumice Products, Inc. website product description, accessed Apr. 29, 2013, available at: http://www.hesspumice.com/why/PDFs/DSFactSheet.pdf.
Zonesealant 2000 Agent, Halliburton Energy Services, Inc. website product description, dated 2013, available at: http://www.halliburton.com/ps/default.aspx?pageid=5464&navid=2613.
PressurSeal LCM Agent, Halliburton Energy Services, Inc. website product description, dated 2013, available at: http://www.halliburton.com/ps/default.aspx?pageid=5474&navid=2616.
Silicalite Cement Additive, Halliburton Energy Services, Inc. website product description, dated 2007, available at: http://www.halliburton.com/public/cem/contents/Chem_Compliance/web/H01484.pdf.
Pozmix A, Halliburton Energy Services, Inc. website product description, dated 2007, available at: http://www.halliburton.com/public/cem/contents/Chem_Compliance/web/H02048.pdf.
D-Air 3000 Defoamer, Halliburton Energy Services, Inc. website product description, dated 2013, available at: http://www.halliburton.com/ps/default.aspx?pageid=309&navid=168.
Ultrasonic Cement Analyzer Model 304, Fann Instrument Company website product description, dated 2013, available at http://www.fann.com/products/defaultaspx?pageid=430&navid=235&prodid=FPN::JJN5QPFSO.
LifeCem Cements, Halliburton Energy Services, Inc. website product description, dated 2013, available at: http://www.halliburton.com/ps/default.aspx?pageid=1857&prodid=PRN::JTERQN15.

(Continued)

*Primary Examiner* — Zakiya W Bates
(74) *Attorney, Agent, or Firm* — Craig W. Roddy; Tumey L.L.P.

(57) ABSTRACT

Systems for remedial cementing are provided that utilize pumice and various additives. One of the systems for remedial cementing embodiments comprises a lightweight settable composition comprising pumice, a calcium activator, and water, wherein the lightweight settable composition has a density of less than about 13.5 pounds per gallon; mixing equipment for mixing the lightweight settable composition; and pumping equipment for delivering the lightweight settable composition to a well bore.

18 Claims, No Drawings

(56) References Cited

OTHER PUBLICATIONS

MetaMax High reactivity metakaolin for Concrete, BASF website product description, accessed Apr. 29, 2013, available at: http://kaolin.basf.com/files/pdf/MetaMax_Brochure.pdf.

D.P. Ewert, S.W. Almond, W.M. Bierhaus II; Small-Particle Size Cement, SPE Production Engineering, May 1991, pp. 213-216.

FineCem Cement, Halliburton Energy Services, Inc., company brochure product description, dated 2010.

U.S. Appl. No. 13/873,905 by Chatterji et al. filed Apr. 30, 2013.

International Search Report and Written Opinion for International Application No. PCT/US2014/035443 dated Aug. 26, 2014.

* cited by examiner

PUMICE-CONTAINING REMEDIAL COMPOSITIONS AND SYSTEMS FOR USE

CROSS-REFERENCE TO RELATED APPLICATIONS

This application is a divisional application of U.S. patent application Ser. No. 13/873,905, entitled "Pumice-Containing Remedial Compositions and Methods of Use," filed on Apr. 30, 2013, the entire disclosure of which is incorporated herein by reference.

BACKGROUND

The present invention relates to cementing operations and, more particularly, in certain embodiments, to methods and compositions that utilize pumice and various additives.

In cementing operations, such as well construction and remedial cementing, settable compositions are commonly utilized. As used herein, the term "settable composition" refers to a composition that hydraulically sets or otherwise develops compressive strength. Settable compositions may be used in primary cementing operations whereby pipe strings, such as casing and liners, are cemented in well bores. In a typical primary cementing operation, a settable composition may be pumped into an annulus between the exterior surface of the pipe string disposed therein and the walls of the well bore (or a larger conduit in the well bore). The settable composition may set in the annular space, thereby forming an annular sheath of hardened, substantially impermeable material (e.g., a cement sheath) that may support and position the pipe string in the well bore and may bond the exterior surface of the pipe string to the well bore walls (or the larger conduit). Among other things, the cement sheath surrounding the pipe string should function to prevent the migration of fluids in the annulus, as well as protecting the pipe string from corrosion. Settable compositions also may be used in remedial cementing methods, such as in squeeze cementing for sealing voids in a pipe string, cement sheath, gravel pack, subterranean formation, and the like.

In remedial cementing, settable compositions may be used for sealing voids in a pipe string or a cement sheath. As used herein the term "void" refers to any type of space, including fractures, holes, cracks, channels, spaces, and the like. Such voids may include: holes or cracks in the pipe strings; holes, cracks, spaces, or channels in the cement sheath; and very small spaces (commonly referred to as "microannuli") between the cement sheath and the exterior surface of the well casing or formation. Sealing such voids may prevent the undesired flow of fluids (e.g., oil, gas, water, etc.) and/or fine solids into, or from, the well bore. The sealing of such voids, whether or not made deliberately, has been attempted by introducing a substance into the void and permitting it to remain therein to seal the void. If the substance does not fit into the void, a bridge, patch, or sheath may be formed over the void to possibly produce a termination of the undesired fluid flow. Substances used heretofore in methods to terminate the undesired passage of fluids through such voids include settable compositions comprising water and hydraulic cement, wherein the methods employ hydraulic pressure to force the settable composition into the void. Once placed into the void, the settable composition may be permitted to harden.

Remedial cementing operations also may be used to seal portions of subterranean formations or portions of gravel packs. The portions of the subterranean formation may include permeable portions of a formation and fractures (natural or otherwise) in the formation and other portions of the formation that may allow the undesired flow of fluid into, or from, the well bore. The portions of the gravel pack include those portions of the gravel pack, wherein it is desired to prevent the undesired flow of fluids into, or from, the well bore. A "gravel pack" is a term commonly used to refer to a volume of particulate materials (such as sand) placed into a well bore to at least partially reduce the migration of unconsolidated formation particulates into the well bore. While screenless gravel packing operations are becoming more common, gravel packing operations commonly involve placing a gravel pack screen in the well bore neighboring a desired portion of the subterranean formation, and packing the surrounding annulus between the screen and the well bore with particulate materials that are sized to prevent and inhibit the passage of formation solids through the gravel pack with produced fluids. Among other things, this method may allow sealing of the portion of the gravel pack to prevent the undesired flow of fluids without requiring the gravel pack's removal.

A broad variety of settable compositions have been used heretofore, including cement compositions comprising Portland cement. Portland cement is generally prepared from a mixture of raw materials comprising calcium oxide, silicon oxide, aluminum oxide, ferric oxide, and magnesium oxide. The mixture of the raw materials is heated in a kiln to approximately 2700° F., thereby initiating chemical reactions between the raw materials. In these reactions, crystalline compounds, dicalcium silicates, tricalcium silicates, tricalcium aluminates, and tetracalcium aluminoferrites, are formed. The product of these reactions is known as a clinker. The addition of a gypsum/anhydrate mixture to the clinker and the pulverization of the mixture results in a fine powder that will react to form a slurry upon the addition of water.

There are drawbacks, however, to the conventional preparation and use of Portland cement. The energy requirements to produce Portland cement are quite high, and heat loss during production can further cause actual energy requirements to be even greater. These factors contribute significantly to the relatively high cost of Portland cement. Generally, Portland cement is a major component of the cost of hydraulic cement compositions that comprise Portland cement. Recent Portland cement shortages, however, have further contributed to the rising cost of hydraulic cement compositions that comprise Portland cement.

SUMMARY

An embodiment provides a method of remedial cementing in a subterranean formation comprising: providing a lightweight settable composition comprising pumice, a calcium activator, and water, wherein the lightweight settable composition has a density of less than about 13.5 pounds per gallon and is free of Portland cement; and using the lightweight settable composition in a remedial cementing method to seal one or more voids in a well bore.

Another embodiment provides a pumice-containing remedial settable composition comprising: pumice; a calcium activator; and water, wherein the lightweight settable composition has a density of less than about 13.5 pounds per gallon, and wherein the lightweight settable composition is free of Portland cement.

Yet another embodiment provides a system for remedial cementing comprising: a lightweight settable composition comprising pumice, a calcium activator, and water, wherein the lightweight settable composition has a density of less than about 13.5 pounds per gallon; mixing equipment for mixing the lightweight settable composition, and pumping equipment for delivering the lightweight settable composition to a well bore.

The features and advantages of the present invention will be readily apparent to those skilled in the art. While numerous changes may be made by those skilled in the art, such changes are within the spirit of the invention.

DESCRIPTION OF PREFERRED EMBODIMENTS

Embodiments of the present invention disclose lightweight settable compositions comprising pumice, a calcium activator, and water, wherein the lightweight settable compositions are free of Portland cement. Other additives that may be included in the lightweight settable compositions include shale, zeolite, amorphous silica, fly ash, metakaolin, perlite, rice hull ash, and/or swellable particulate elastomer. One of the many potential advantages of embodiments of the lightweight settable composition is that pumice is a relatively inexpensive component in comparison to traditional cements such as Portland cement. Another advantage is that pumice manufacture and subsequent use in a settable composition is less environmentally damaging as compared to cements such as Portland cement. Therefore, a pumice settable composition would have a smaller carbon footprint. One more additional advantage is that the pumice-containing settable compositions are lightweight and fast setting. Accordingly, embodiments of the lightweight settable compositions may be used in a variety of subterranean applications for remedial cementing operations such in squeeze cementing for sealing voids in a pipe string, cement sheath, gravel pack, subterranean formation, and the like.

In some embodiments, the lightweight settable compositions may comprise pumice. Generally, pumice is a volcanic rock that exhibits cementitious properties, in that it may set and harden in the presence of a calcium activator and water. The calcium activator may be used in combination with the pumice, for example, to provide sufficient calcium ions for the pumice to set. The pumice may also be ground, for example. Generally, the pumice may have any particle size distribution as desired for a particular application. In certain embodiments, the pumice may have a mean particle size in a range of from about 1 micron to about 200 microns. The mean particle size corresponds to d50 values as measured by particle size analyzers such as those manufactured by Malvern Instruments, Worcestershire, United Kingdom. In specific embodiments, the pumice may have a mean particle size in a range of from about 1 micron to about 200 micron, from about 5 microns to about 100 microns, or from about 10 micron to about 50 microns. In one particular embodiment, the pumice may have a mean particle size of less than about 15 microns. An example of a suitable pumice is DS-200 lightweight aggregate available from Hess Pumice Products, Inc., Malad City, Id., having an average particle size of less than 20 microns. In some embodiments, a total amount of cementitious components in the settable composition may consist essentially of and/or consist of the pumice. One of ordinary skill in the art, with the benefit of this disclosure, will recognize the appropriate amount of the pumice to include for a chosen application.

In some embodiments, the settable compositions may comprise a calcium activator. The term "calcium activator" refers to a material that generates calcium ions when mixed with water. The pumice reacts with the calcium ions to react and form a hardened mass. The calcium activator may be included in the settable compositions to provide calcium ions for activation of the pumice, thus providing a settable composition that will react with the water to form a hardened mass in accordance with embodiments of the present invention. Any of a variety of suitable calcium activators may be used that are capable of generating calcium ions when dissolved in the water. Examples of suitable calcium activators include calcium formate, lime (e.g., hydrated lime), and any combination thereof. In some embodiments, the calcium activators may be present in the settable compositions in an amount in the range of from about 0.1% to about 25% by weight of the pumice. In further embodiments, the calcium activator may be included in an amount in the range of from about 1% to about 10% by weight of the pumice.

In some embodiments, the settable compositions may be free of Portland cement. In some embodiments, the settable compositions may be essentially free of any additional cementitious materials, such as hydraulic cements, including, but not limited to, those comprising calcium, aluminum, silicon, oxygen, iron, and/or sulfur, which set and harden by reaction with water. Specific examples of hydraulic cements include, but are not limited to, Portland cements, pozzolana cements, gypsum cements, high alumina content cements, silica cements, and any combination thereof. In some embodiments, the Portland cements are classified as Classes A, C, H, or G cements according to American Petroleum Institute, *API Specification for Materials and Testing for Well Cements*, API Specification 10, Fifth Ed., Jul. 1, 1990. In addition, in some embodiments, the hydraulic cement may include cements classified as ASTM Type I, II, or III. In some embodiments, the settable compositions may comprise additional cementitious materials in an amount less than about 1% by weight of the pumice and, alternatively, less than about 0.1% by weight of the pumice.

The water used in embodiments of the settable compositions of the present invention may include, for example, freshwater, saltwater (e.g., water containing one or more salts dissolved therein), brine (e.g., saturated saltwater produced from subterranean formations), seawater, or any combination thereof. Generally, the water may be from any source, provided, for example, that it does not contain an excess of compounds that may undesirably affect other components in the settable compositions. In some embodiments, the water may be included in an amount sufficient to form a pumpable slurry. In some embodiments, the water may be included in the settable compositions of the present invention in an amount in a range of from about 40% to about 200% by weight of the pumice. In some embodiments, the water may be included in an amount in a range of from about 40% to about 150% by weight of the pumice.

Embodiments of the lightweight settable compositions may be foamed with a foaming additive and a gas, for example, to provide a composition with a reduced density. In some embodiments, the lightweight settable composition may be foamed to have a density of less than about 12 pounds per gallon ("lbs/gal"), less than about 11 lbs/gal, or less than about 10 lbs/gal. In some embodiments, the lightweight settable composition may be foamed to have a density in a range of from about from about 4 lbs/gal to about 12 lbs/gal and, alternatively, about 7 lbs/gal to about 9 lbs/gal. The gas used for foaming the lightweight settable compositions may be any suitable gas for foaming the lightweight settable composition, including, but not limited to air, nitrogen, and combinations thereof. Generally, the gas should be present in embodiments of the foamed lightweight settable composition in an amount sufficient to form the desired foam. In certain embodiments, the gas may be present in an amount in the range of from about 5% to about 80% by volume of the foamed lightweight settable composition at atmospheric pressure, alternatively, about 5% to about 55% by volume, and, alternatively, about 15% to about 30% by volume.

Foaming additives may be included in embodiments of the lightweight settable compositions to, for example, facilitate foaming and/or stabilize the resultant foam formed therewith. Examples of suitable foaming additives include, but are not limited to: mixtures of an ammonium salt of an alkyl ether sulfate, a cocoamidopropyl betaine surfactant, a cocoamidopropyl dimethylamine oxide surfactant, sodium chloride, and water; mixtures of an ammonium salt of an alkyl ether sulfate surfactant, a cocoamidopropyl hydroxysultaine surfactant, a cocoamidopropyl dimethylamine oxide surfactant, sodium chloride, and water; hydrolyzed keratin; mixtures of an ethoxylated alcohol ether sulfate surfactant, an alkyl or alkene amidopropyl betaine surfactant, and an alkyl or alkene dimethylamine oxide surfactant; aqueous solutions of an alpha-olefinic sulfonate surfactant and a betaine surfactant; and combinations thereof. An example of a suitable foaming additive is ZONESEALANT™ 2000 agent, available from Halliburton Energy Services, Inc.

As previously mentioned, embodiments of the lightweight settable compositions may include one or more additives selected from shale, zeolite, amorphous silica, fly ash, metakaolin, perlite, rice hull ash, and/or swellable elastomers. These additives may be included in the lightweight settable compositions to improve one or more properties, including mechanical properties such as compressive strength.

In certain embodiments, the lightweight settable compositions of the present invention may comprise shale in an amount sufficient to provide the desired compressive strength, density, and/or cost. A variety of shales are suitable, including those comprising silicon, aluminum, calcium, and/or magnesium. Suitable examples of shale include, but are not limited to, PRESSUR-SEAL® FINE LCM material and PRESSUR-SEAL® COARSE LCM material, which are commercially available from TXI Energy Services, Inc., Houston, Tex. Generally, the shale may have any particle size distribution as desired for a particular application. In certain embodiments, the shale may have a particle size distribution in the range of about 37 microns to about 4,750 microns. In some embodiments the shale may be vitrified shale. In some embodiments the shale may be calcined shale. In certain embodiments, the shale may be present in the lightweight settable compositions of the present invention in an amount in the range of from about 0.1% to about 100% by weight of the pumice. In some embodiments, the shale may be present in an amount ranging between any of and/or including any of about 10%, about 20%, about 30%, about 40%, about 50%, about 60%, about 70%, about 80%, about 90%, or about 100% by weight of the pumice. One of ordinary skill in the art, with the benefit of this disclosure, will recognize the appropriate amount of the shale to include for a chosen application.

In certain embodiments, the lightweight settable compositions of the present invention may comprise zeolite. Zeolite may be used in conjunction with the shale in some embodiments. In other embodiments, zeolite may be an alternative to shale. The choice may be dictated by a number of factors, such as total extent of compressive strength of the cement, time for cement composition to develop compressive strength, and density of the composition. Zeolites generally are porous alumino-silicate minerals that may be either a natural or synthetic material. Synthetic zeolites are based on the same type of structural cell as natural zeolites, and may comprise aluminosilicate hydrates. As used herein, the term "zeolite" refers to all natural and synthetic forms of zeolite. In certain embodiments, the zeolite may be present in the lightweight settable compositions of the present invention in an amount in the range of from about 0.1% to about 100% by weight of the pumice. In some embodiments, the zeolite may be present in an amount ranging between any of and/or including any of about 10%, about 20%, about 30%, about 40%, about 50%, about 60%, about 70%, about 80%, about 90%, or about 100% by weight of the pumice. One of ordinary skill in the art, with the benefit of this disclosure, will recognize the appropriate amount of the zeolite to include for a chosen application.

In certain embodiments, the lightweight settable compositions of the present invention may comprise amorphous silica. Amorphous silica is generally a byproduct of a ferrosilicon production process, wherein the amorphous silica may be formed by oxidation and condensation of gaseous silicon suboxide, SiO, which is formed as an intermediate during the process. An example of a suitable source of amorphous silica is SILICALITE™, available from Halliburton Energy Services, Inc. In certain embodiments, the amorphous silica may be present in the lightweight settable compositions of the present invention in an amount in the range of from about 0.1% to about 40% by weight of the pumice. In some embodiments, the amorphous silica may be present in an amount ranging between any of and/or including any of about 10%, about 20%, about 30%, and about 40% by weight of the pumice. One of ordinary skill in the art, with the benefit of this disclosure, will recognize the appropriate amount of the shale to include for a chosen application.

Fly ash may be included in embodiments of the lightweight settable compositions of the present invention. A variety of fly ashes may be suitable, including fly ash classified as Class C and Class F fly ash according to American Petroleum Institute, API Specification for Materials and Testing for Well Cements, API Specification 10, Fifth Ed., Jul. 1, 1990. Class C fly ash comprises both silica and lime so that, when mixed with water, it sets to form a hardened mass. Class F fly ash generally does not contain sufficient lime, so an additional source of calcium ions may be required for the Class F fly ash to form a settable composition with water. In some embodiments, lime may be mixed with Class F fly ash in an amount in the range of about 0.1% to about 25% by weight of the fly ash. In some instances, the lime may be hydrated lime. Suitable examples of fly ash include, but are not limited to, POZMIX® A cement additive, available from Halliburton Energy Services, Inc. Where present, the fly ash generally may be included in the lightweight settable compositions in an amount sufficient to provide the desired compressive strength, density, and/or cost. In certain embodiments, the fly ash may be present in the lightweight settable compositions of the present invention in an amount in the range of from about 0.1% to about 100% by weight of the pumice. In some embodiments, the fly ash may be present in an amount ranging between any of and/or including any of about 10%, about 20%, about 30%, about 40%, about 50%, about 60%, about 70%, about 80%, about 90%, or about 100% by weight of the pumice. One of ordinary skill in the art, with the benefit of this disclosure, will recognize the appropriate amount of the fly ash to include for a chosen application.

Metakaolin may be included in embodiments of the lightweight settable compositions of the present invention. Generally, metakaolin is a white pozzolan that may be prepared by heating kaolin clay, for example, to temperatures in the range of about 600° C. to about 800° C. In certain embodiments, the metakaolin may be present in the lightweight settable compositions of the present invention in an amount in the range of from about 0.1% to about 100% by weight of the pumice. In some embodiments, the metakaolin may be present in an amount ranging between any of and/or including any of about 10%, about 20%, about 30%, about 40%, about 50%, about 60%, about 70%, about 80%, about 90%, or about 100% by weight of the pumice. One of ordinary skill in the art, with the benefit of this disclosure, will recognize the appropriate amount of the metakaolin to include for a chosen application.

Perlite may be included in embodiments of the lightweight settable compositions of the present invention. Perlite is an ore and generally refers to a naturally occurring volcanic, amorphous siliceous rock comprising mostly silicon dioxide and aluminum oxide. Perlite suitable for use in embodiments of the present invention includes expanded perlite and unexpanded perlite. Examples of suitable perlite include expanded and/or unexpanded perlite. The expanded or unexpanded perlite may also be ground, for example. In certain embodiments, the perlite may be present in the lightweight settable compositions of the present invention in an amount in the range of from about 0.1% to about 100% by weight of the pumice. In some embodiments, the perlite may be present in an amount ranging between any of and/or including any of about 10%, about 20%, about 30%, about 40%, about 50%, about 60%, about 70%, about 80%, about 90%, or about 100% by weight of the pumice. One of ordinary skill in the art, with the benefit of this disclosure, will recognize the appropriate amount of the perlite to include for a chosen application.

Rice hull ash may be included in embodiments of the lightweight settable compositions of the present invention. In general, rice hull ash is the ash produced from the burning of rice hulls, which are the hard coverings of grains of rice, and may comprise primarily silica and carbon. In certain embodiments, the rice hull ash may be present in the lightweight settable compositions of the present invention in an amount in the range of from about 0.1% to about 100% by weight of the pumice. In some embodiments, the rice hull ash may be present in an amount ranging between any of and/or including any of about 10%, about 20%, about 30%, about 40%, about 50%, about 60%, about 70%, about 80%, about 90%, or about 100% by weight of the pumice. One of ordinary skill in the art, with the benefit of this disclosure, will recognize the appropriate amount of the rice hull ash to include for a chosen application.

A swellable particulate elastomer may be included in embodiments of the lightweight settable compositions of the present invention. Particulate elastomers suitable for use in embodiments of the present invention may generally swell by up to about 100% of their original size at the surface when contacted by oil. Under downhole conditions, this swelling may be more, or less, depending on the conditions presented. For example, the swelling may be at least 10% at downhole conditions, in some embodiments, the swelling may be up to about 50% under downhole conditions. However, as those of ordinary skill in the art, with the benefit of this disclosure, will appreciate, the actual swelling when the particulate elastomer is included in a lightweight settable composition may depend on, for example, the elastomer concentration, downhole pressure, and downhole temperature, among other factors. Some specific examples of suitable particulate elastomers include, but are not limited to, natural rubber, acrylate butadiene rubber, polyacrylate rubber, isoprene rubber, chloroprene rubber, butyl rubber (HR), brominated butyl rubber (BIIR), chlorinated butyl rubber (CIIR), chlorinated polyethylene (CM/CPE), neoprene rubber (CR), styrene butadiene copolymer rubber (SBR), styrene butadiene block copolymer rubber, sulphonated polyethylene (CSM), ethylene acrylate rubber (EAM/AEM), epichlorohydrin ethylene oxide copolymer (CO, ECO), ethylene-propylene rubber (EPM and EDPM), ethylene-propylene-diene terpolymer rubber (EPT), ethylene vinyl acetate copolymer, fluorosilicone rubbers (FVMQ), silicone rubbers (VMQ), poly 2,2,1-bicyclo heptene (polynorbornene), alkylstyrene, and crosslinked vinyl acrylate copolymers. In certain embodiments, the swellable particulate elastomer may be present in the lightweight settable compositions of the present invention in an amount in the range of from about 0.1% to about 100% by weight of the pumice. In some embodiments, the swellable particulate elastomer may be present in an amount ranging between any of and/or including any of about 10%, about 20%, about 30%, about 40%, about 50%, about 60%, about 70%, about 80%, about 90%, or about 100% by weight of the pumice. One of ordinary skill in the art, with the benefit of this disclosure, will recognize the appropriate amount of the swellable particulate elastomer to include for a chosen application.

Other additives suitable for use in subterranean remedial cementing operations may also be added to embodiments of the lightweight settable compositions, in accordance with embodiments of the present invention. Examples of such additives include, but are not limited to, strength-retrogression additives, set accelerators, set retarders, lightweight additives, gas-generating additives, mechanical property enhancing additives, lost-circulation materials, fluid loss control additives, defoaming additives, thixotropic additives, and any combination thereof. Specific examples of these, and other, additives include crystalline silica, fumed silica, silicates, silicalite, salts, fibers, hydratable clays, shale, microspheres, diatomaceous earth, natural pozzolan, cement kiln dust, resins, any combination thereof, and the like. A person having ordinary skill in the art, with the benefit of this disclosure, will readily be able to determine the type and amount of additive useful for a particular application and desired result.

Strength-retrogression additives may be included in embodiments of the lightweight settable composition to, for example, prevent the retrogression of strength after the settable composition has been allowed to develop compressive strength when the settable composition is exposed to high temperatures. These additives may allow the settable compositions to form as intended, preventing cracks and premature failure of the cementitious composition. Examples of suitable strength-retrogression additives may include, but are not limited to, amorphous silica, coarse grain crystalline silica, fine grain crystalline silica, or a combination thereof.

Set accelerators may be included in embodiments of the lightweight settable compositions to, for example, increase the rate of setting reactions. Control of setting time may allow for the ability to adjust to well bore conditions or customize set times for individual jobs. Examples of suitable set accelerators may include, but are not limited to, aluminum sulfate, alums, calcium chloride, calcium sulfate, gypsum-hemihydrate, sodium aluminate, sodium carbonate, sodium chloride, sodium silicate, sodium sulfate, ferric chloride, or a combination thereof.

Set retarders may be included in embodiments of the lightweight settable compositions to, for example, increase the thickening time of the settable compositions. Examples of suitable set retarders include, but are not limited to, ammonium, alkali metals, alkaline earth metals, borax, metal salts of calcium lignosulfonate, carboxymethyl hydroxyethyl cellulose, sulfoalkylated lignins, hydroxycarboxy acids, copolymers of 2-acrylamido-2-methylpropane sulfonic acid salt and acrylic acid or maleic acid, saturated salt, or a combination thereof. One example of a suitable sulfoalkylated lignin comprises a sulfomethylated lignin.

Lightweight additives may be included in embodiments of the lightweight settable compositions to, for example, decrease the density of the settable compositions. Examples of suitable lightweight additives include, but are not limited to, bentonite, coal, diatomaceous earth, expanded perlite, fly ash, gilsonite, hollow microspheres, low-density elastic beads, nitrogen, pozzolan-bentonite, sodium silicate, combinations thereof, or other lightweight additives known in the art.

Gas-generating additives may be included in embodiments of the lightweight settable compositions to release gas at a predetermined time, which may be beneficial to prevent gas migration from the formation through the settable composition before it hardens. The generated gas may combine with or inhibit the permeation of the settable composition by formation gas. Examples of suitable gas-generating additives include, but are not limited to, metal particles (e.g., aluminum powder) that react with an alkaline solution to generate a gas.

Mechanical-property-enhancing additives may be included in embodiments of the lightweight settable compositions to, for example, ensure adequate compressive strength and long-term structural integrity. These properties can be affected by the strains, stresses, temperature, pressure, and impact effects from a subterranean environment. Examples of mechanical property enhancing additives include, but are not limited to, carbon fibers, glass fibers, metal fibers, mineral fibers, silica fibers, polymeric elastomers, and latexes.

Lost-circulation materials may be included in embodiments of the lightweight settable compositions to, for example, help prevent the loss of fluid circulation into the subterranean formation. Examples of lost-circulation materials include but are not limited to, cedar bark, shredded cane stalks, mineral fiber, mica flakes, cellophane, calcium carbonate, ground rubber, polymeric materials, pieces of plastic, grounded marble, wood, nut hulls, formica, corncobs, and cotton hulls.

Fluid-loss-control additives may be included in embodiments of the lightweight settable compositions to, for example, decrease the volume of fluid that is lost to the subterranean formation. Properties of the settable compositions may be significantly influenced by their water content. The loss of fluid can subject the settable compositions to degradation or complete failure of design properties. Examples of suitable fluid-loss-control additives include, but not limited to, certain polymers, such as hydroxyethyl cellulose, carboxymethylhydroxyethyl cellulose, copolymers of 2-acrylamido-2-methylpropanesulfonic acid and acrylamide or N,N-dimethylacrylamide, and graft copolymers comprising a backbone of lignin or lignite and pendant groups comprising at least one member selected from the group consisting of 2-acrylamido-2-methylpropanesulfonic acid, acrylonitrile, and N,N-dimethylacrylamide.

Defoaming additives may be included in embodiments of the lightweight settable compositions to, for example, reduce tendency for the settable composition to foam during mixing and pumping of the settable compositions. Examples of suitable defoaming additives include, but are not limited to, polyol silicone compounds. Suitable defoaming additives are available from Halliburton Energy Services, Inc., under the product name D-AIR™ defoamers.

Thixotropic additives may be included in embodiments of the lightweight settable compositions to, for example, provide a settable composition that can be pumpable as a thin or low viscosity fluid, but when allowed to remain quiescent attains a relatively high viscosity. Among other things, thixotropic additives may be used to help control free water, create rapid gelation as the slurry sets, combat lost circulation, prevent "fallback" in annular column, and minimize gas migration. Examples of suitable thixotropic additives include, but are not limited to, gypsum, water soluble carboxyalkyl, hydroxyalkyl, mixed carboxyalkyl hydroxyalkyl either of cellulose, polyvalent metal salts, zirconium oxychloride with hydroxyethyl cellulose, or a combination thereof.

Those of ordinary skill in the art will appreciate that the lightweight settable compositions generally may be characterized as lightweight in that the settable compositions have a density that does not exceed about 13.5 lb/gal. Because the settable compositions are lightweight, they may be used in applications where heavier compositions may not be suitable, for example, those with fracture gradients that would be exceed by the heavier compositions. Lightweight settable compositions may also be used, for example, to prevent the collapse of depleted zones that may results from a heavier composition. In an exemplary embodiment, the density of the settable compositions is about 12.5 lb/gal. Those of ordinary skill in the art, with the benefit of this disclosure, will recognize the appropriate density for a particular application.

The components of the lightweight settable composition may be combined in any order desired to form a settable composition that can be placed into a subterranean formation. In addition, the components of the settable compositions may be combined using any mixing device compatible with the composition, including a bulk mixer, for example. In some embodiments, the settable compositions may be prepared by combining the dry components with water. Other additives may be combined with the water before it is added to the dry components. In some embodiments, the dry components may be dry blended prior to their combination with the water. In some embodiments, a dry blend may be prepared that comprises the pumice. The dry blend may also comprise one or more of shale, zeolite, amorphous silica, fly ash, metakaolin, perlite, rice hull ash, and/or swellable particulate elastomer. The calcium-ion source may be added, for example, to the water or the dry blend. Other suitable techniques may be used for preparation of the setting compositions as will be appreciated by those of ordinary skill in the art in accordance with embodiments of the present invention.

In remedial cementing embodiments, the lightweight settable compositions may be used, for example, in squeeze-cementing operations. By way of example, the settable compositions may be placed in a well bore to plug a void or crack in the formation, in a gravel pack, in the conduit, in the cement sheath, and/or a microannulus between the cement sheath and the conduit.

An example of a method of the present invention is method of sealing a portion of a gravel pack or a portion of a subterranean formation. An example of such a method may comprise providing a lightweight settable composition; introducing the lightweight settable composition into the portion of the gravel pack or the portion of the subterranean formation; and allowing the lightweight settable composition to form a hardened mass in the portion. The portions of the subterranean formation may include permeable portions of the formation and fractures (natural or otherwise) in the formation and other portions of the formation that may allow the undesired flow of fluid into, or from, the well bore. The portions of the gravel pack include those portions of the gravel pack, wherein it is desired to prevent the undesired flow of fluids into, or from, the well bore. Among other things, this method may allow the sealing of the portion of the gravel pack to prevent the undesired flow of fluids without requiring the gravel pack's removal.

Another example of a method of the present invention is a method of sealing voids located in a pipe string (e.g., casing, expandable casings, liners, etc.) or in a cement sheath. Generally, the pipe string will be disposed in a well bore, and the cement sheath may be located in the annulus between the pipe string disposed in the well bore and a wall of the well bore. An example of such a method may comprise providing a lightweight settable composition; introducing the lightweight settable composition into the void; and allowing the lightweight settable composition to set to form a hardened mass in the void.

When sealing a void in a pipe string, the methods of the present invention, in some embodiments, further may comprise locating the void in the pipe string; and isolating the void by defining a space within the pipe string in communication with the void; wherein the lightweight settable composition may be introduced into the void from the space. The void may be isolated using any suitable technique and/or apparatus, including bridge plugs, packers, and the like. The void in the pipe string may be located using any suitable technique.

When sealing a void in the cement sheath, the methods of the present invention, in some embodiments, further may comprise locating the void in the cement sheath; producing a perforation in the pipe string that intersects the void; and isolating the void by defining a space within the pipe string in communication with the void via the perforation, wherein the lightweight settable composition is introduced into the void via the perforation. The void in the pipe string may be located using any suitable technique. The perforation may be created in the pipe string using any suitable technique, for example, perforating guns. The void may be isolated using any suitable technique and/or apparatus, including bridge plugs, packers, and the like.

In some embodiments, the lightweight settable compositions may set to have a desirable compressive strength for remedial cementing operations. Compressive strength is generally the capacity of a material or structure to withstand axially directed pushing forces. The compressive strength may be measured at a specified time after the settable compositions have been positioned and the settable compositions are maintained under specified temperature and pressure conditions. Compressive strength can be measured by either a destructive method or non-destructive method. The destructive method physically tests the strength of treatment fluid samples at various points in time by crushing the samples in a compression-testing machine. The compressive strength is calculated from the failure load divided by the cross-sectional area resisting the load and is reported in units of pound-force per square inch (psi). Non-destructive methods typically may employ an Ultrasonic Cement Analyzer ("UCA"), available from Fann Instrument Company, Houston, Tex. Compressive strengths may be determined in accordance with API RP 10B-2, *Recommended Practice for Testing Well Cements*, First Edition, July 2005.

By way of example, the lightweight settable compositions, may develop a 24-hour compressive strength—after mixing of the dry blend with the water—in the range of from about 100 psi to about 165 psi, alternatively, from about 80 psi to about 165 psi, or alternatively from about 100 psi to about 600 psi. In some embodiments, the lightweight settable composition may develop a compressive strength in 24 hours of at least about 20 psi, at least about 100 psi, at least about 500 psi, or more.

The exemplary lightweight settable compositions disclosed herein may directly or indirectly affect one or more components or pieces of equipment associated with the preparation, delivery, recapture, recycling, reuse, and/or disposal of the disclosed settable compositions. For example, the disclosed settable compositions may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary settable compositions. The disclosed settable compositions may also directly or indirectly affect any transport or delivery equipment used to convey the settable compositions to a well site or downhole such as, for example, any transport vessels, conduits, pipelines, trucks, tubulars, and/or pipes used to compositionally move the settable compositions from one location to another, any pumps, compressors, or motors (e.g., topside or downhole) used to drive the settable compositions into motion, any valves or related joints used to regulate the pressure or flow rate of the settable compositions, and any sensors (i.e., pressure and temperature), gauges, and/or combinations thereof, and the like. The disclosed settable compositions may also directly or indirectly affect the various downhole equipment and tools that may come into contact with the settable cement compositions such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

EXAMPLES

To facilitate a better understanding of the present invention, the following examples of some of the preferred embodiments are given. In no way should such examples be read to limit, or to define, the scope of the invention.

Example 1

The following series of tests were performed to evaluate the mechanical properties of the lightweight settable compositions. Twelve different lightweight settable compositions, designated Samples 1-12, were prepared using the indicated amounts of water, pumice, lime, shale, and/or zeolite. The amounts of these components are indicated in the table below with percent by weight of blend ("% bwob") indicating the percent of the component by weight of the blend of pumice, shale, and/or zeolite. The pumice used for the tests was either DS 200 or DS 325 lightweight aggregate available from Hess Pumice Products, Malad City, Id. The lime used for the tests was Texas lime from Cleburne, Tex. The shale and zeolite used for the tests were supplied by Magnablend, Inc., Waxahachie, Tex. Sample 1 was a comparative composition that did not include lime as a calcium activator. This sample did not set (DNS) and therefore possessed no measurable compressive strength (0 psi).

After preparation, the samples were allowed to cure for twenty-four hours in a 2" by 4" metal cylinder that was placed in a water bath at 140° F. to form set cylinders. Immediately after removal from the water bath, destructive compressive strengths were determined using a mechanical press in accordance with API RP 10B-2. The results of this test are set forth below.

TABLE 1

| Sample | Density (lb/gal) | Water (% bwob) | Pumice DS 200 (% bwob) | Pumice DS 325 (% bwob) | Lime (% bwob) | Shale (% bwob) | Zeolite (% bwob) | 24 Hr Comp. Strength (psi) |
|---|---|---|---|---|---|---|---|---|
| 1  | 12.5 | 75.06 | —   | 100 | 0   | —  | —  | DNS |
| 2  | 12.5 | 78.65 | —   | 100 | 5   | —  | —  | 112 |
| 3  | 12.5 | 82.24 | —   | 100 | 10  | —  | —  | 256 |
| 4  | 12.5 | 78.65 | 100 | —   | 5   | —  | —  | 140 |
| 5  | 12.5 | 82.24 | 100 | —   | 10  | —  | —  | 218 |
| 6  | 13.5 | 57.47 | 100 | —   | 10  | —  | —  | DNS |
| 7  | 12.5 | 81.38 | 50  | —   | 2.5 | 50 | —  | 110 |
| 8  | 12.5 | 94.97 | 50  | —   | 5   | 50 | —  | 162 |
| 9  | 12.5 | 77.18 | 50  | —   | 5   | 25 | 25 | 96  |
| 10 | 12.5 | 78.98 | 50  | —   | 7.5 | 25 | 25 | 338 |
| 11 | 12.5 | 80.78 | 50  | —   | 10  | 25 | 25 | 407 |
| 12 | 12.5 | 84.37 | 50  | —   | 15  | 25 | 25 | 459 |

Based on the results of these tests, the inclusion of lime as a calcium activator in the settable compositions had a significant impact on compressive strength development. Likewise, the blending of the shale and zeolite additives with the pumice, also produced significant compressive strength gains.

Example 2

The following series of tests were performed to evaluate the mechanical properties of the lightweight settable compositions. Seven different lightweight settable compositions, designated Samples 13-19, were prepared using the indicated amounts of water, pumice, lime, fly ash, metakaolin, or perlite. The amounts of these components are indicated in the table below with percent by weight of blend ("% bwob") indicating the percent of the component by weight of the blend of pumice, fly ash, metakaolin, and/or perlite. The pumice used for the tests was DNS 200 lightweight aggregate available from Hess Pumice Products, Malad City, Id. The lime used for the tests was Texas lime from Cleburne, Tex. The fly ash used for the samples was POZMIX® pozzolanic cement, available from Halliburton Energy Services, Inc. The metakaolin used for the tests was METAMAX® pozzolanic cement additive, available from BASF. The perlite used was ground, unexpanded perlite (IM-325), available from Hess Pumice Products, Malad City, Id.

After preparation, the samples were allowed to cure for twenty-four hours in a 2" by 4" metal cylinder that was placed in a water bath at 140° F. to form set cylinders. Immediately after removal from the water bath, destructive compressive strengths were determined using a mechanical press in accordance with API RP 10B-2. The results of this test are set forth below.

TABLE 2

| Sample | Density (lb/gal) | Water (% bwob) | Pumice (% bwob) | Lime (% bwob) | Fly Ash (% bwob) | Metakaolin (% bwob) | Perlite (% bwob) | 24 Hr Comp. Strength (psi) |
|---|---|---|---|---|---|---|---|---|
| 13 | 12.5 | 86.44 | 80 | 15 | 20 | —  | —  | 162 |
| 14 | 14   | 51.68 | 50 | 15 | 50 | —  | —  | 146 |
| 15 | 14   | 50.94 | 80 | 15 | 20 | —  | —  | 88  |
| 16 | 12.5 | 89.97 | 50 | 10 | —  | 50 | —  | 233 |
| 17 | 12.5 | 93.57 | 50 | 15 | —  | 50 | —  | 579 |
| 18 | 12.5 | 76.58 | 50 | 10 | —  | —  | 50 | 273 |
| 19 | 12.5 | 80.17 | 50 | 15 | —  | —  | 50 | 259 |

Based on the results of these tests, the inclusion of metakaolin provided the largest increase in compressive strength, with the value scaling noticeably with the increase of lime. Perlite showed a lesser increase. The fly ash showed either no increase or a negligible increase as generally compared to the earlier samples without additives (samples 4-6).

Example 3

The following series of tests were performed to evaluate the mechanical properties of the lightweight settable compositions. Six different lightweight settable compositions, designated Samples 20-25, were prepared using the indicated amounts of water, pumice, lime, rice hull ash, amorphous silica, or swellable particulate elastomer. The amounts of these components are indicated in the table below with percent by weight of blend ("% bwob") indicating the percent of the component by weight of the blend of pumice, rice hull ash, amorphous silica, and/or swellable particulate elastomer. The pumice used for the tests was DNS 200 lightweight aggregate available from Hess Pumice Products, Malad City, Id. The lime used for the tests was Texas lime from Cleburne, Tex. The rice hull ash used for the tests is available from Rice Hull Specialty Products Inc., Stuttgart, Ark. The amorphous silica used for the tests was Silicalite™ cement additive, available from Halliburton Energy Services, Inc. The swellable particulate elastomer used for the tests was LIFECEM™ 100, available from Halliburton Energy Services, Inc.

After preparation, the samples were allowed to cure for twenty-four hours in a 2" by 4" metal cylinder that was placed in a water bath at 140° F. to foam set cylinders. Immediately after removal from the water bath, destructive compressive strengths were determined using a mechanical press in accordance with API RP 10B-2. The results of this test are set forth below.

TABLE 3

| Sample | Density (lb/gal) | Water (% bwob) | Pumice (% bwob) | Lime (% bwob) | Rice Hull Ash (% bwob) | Amorphous Silica (% bwob) | Elastomer (% bwob) | 24 Hr Comp. Strength (psi) |
|---|---|---|---|---|---|---|---|---|
| 20 | 12.5 | 85.95 | 50 | 10 | 50 | — | — | 176 |
| 21 | 12.5 | 89.55 | 50 | 15 | 50 | — | — | 208 |
| 22 | 12.5 | 83.43 | 80 | 10 | — | 20 | — | 426 |
| 23 | 12.5 | 87.02 | 80 | 15 | — | 20 | — | 557 |
| 24 | 12.5 | 65.78 | 90 | 10 | — | — | 10 | 194 |
| 25 | 12.5 | 69.37 | 90 | 15 | — | — | 10 | 216 |

Based on the results of these tests, the inclusion of the amorphous silica provided the largest increase in compressive strength, with the value scaling noticeably with the increase of lime. Both rice hull ash and the swellable elastomer showed a much smaller increase in compressive strength.

Example 4

The following series of tests were performed to evaluate the mechanical properties of the lightweight settable compositions after foaming with a foaming additive and a gas. Six different base lightweight settable compositions, designated Samples 1-6, were prepared having a density of 12.5 lbs/gal using the indicated amounts of water, pumice, lime, shale, and/or zeolite, or metakaolin. The amounts of these components are indicated in the tables below with percent by weight of blend ("% bwob") indicating the percent of the component by weight of the blend of pumice, shale, and/or zeolite. Every sample was then foamed by using a foaming additive (ZONESEALANT™ 2000 agent, available from Halliburton Energy Services, Inc) in an amount of 2% by weight of the water to provide the foam density listed in the table below. The pumice used for the tests was DS 200 lightweight aggregate available from Hess Pumice Products, Malad City, Id. The lime used for the tests was Texas lime from Cleburne, Tex. The shale and zeolite used for the tests were supplied by Magnablend, Inc., Waxahachie, Tex. The metakaolin used for the tests was METAMAX® pozzolanic cement additive, available from BASF. Every foamed sample is a foamed version of a previous sample and corresponds to another sample previously listed above. The foamed samples are presented in Table 4.

After preparation, the samples were allowed to cure for twenty-four hours in a 2" by 4" metal cylinder that was placed in a water bath at 140° F. to form set cylinders. Immediately after removal from the water bath, destructive compressive strengths were determined using a mechanical press in accordance with API RP 10B-2. The results of this test are set forth below.

TABLE 4

| Foamed Sample | Foam Density (lb/gal) | Water (% bwob) | Pumice (% bwob) | Lime (% bwob) | Shale (% bwob) | Zeolite (% bwob) | Metakaolin (% bwob) | 24 Hr Comp. Strength (psi) |
|---|---|---|---|---|---|---|---|---|
| 26 | 9.36 | 78.65 | 100 | 5 | — | — | — | 72 |
| 27 | 9.9 | 82.24 | 100 | 10 | — | — | — | 113 |
| 28 | 9.89 | 81.38 | 50 | 2.5 | 50 | — | — | 73 |
| 29 | 9.88 | 94.97 | 50 | 5 | 50 | — | — | 20 |
| 30 | 9.48 | 84.37 | 50 | 15 | 25 | 25 | — | 238 |
| 31 | 9.54 | 93.57 | 50 | 15 | — | — | 50 | 193 |

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present invention. If there is any conflict in the usages of a word or term in this specification and one or more patent(s) or other documents that may be incorporated herein by reference, the definitions that are consistent with this specification should be adopted.

What is claimed is:

1. A remedial cementing system for cementing in a subterranean formation comprising:
a lightweight settable composition comprising pumice, a calcium activator, and water, wherein the water is present in an amount in a range of from about 40% to about 200% by weight of the pumice, wherein the lightweight settable composition has a density of less than about 13.5 pounds per gallon; wherein the lightweight settable composition is essentially free of any additional cementitious components; and wherein the lightweight settable composition is foamed with a foaming additive and a gas;
mixing equipment for mixing the lightweight settable composition; and
pumping equipment for delivering the lightweight settable composition into a void or crack in the subterranean formation, a gravel pack, a conduit, a cement sheath, or a microannulus.

2. The system of claim 1, wherein the mixing equipment is configured for mixing the pumice, calcium activator, and water; and wherein the pumping equipment is configured for pumping the lightweight settable composition through a pipe string in the well bore.

3. The system of claim 1, wherein the calcium activator is present in an amount of about 0.1% to about 25% by weight of the pumice.

4. The system of claim 1, wherein the calcium activator comprises a material selected from the group consisting of calcium formate, lime, hydrated lime, and any combination thereof.

5. The system of claim 1, wherein the lightweight settable composition further comprises at least one additive selected from the group consisting of shale, zeolite, amorphous silica, fly ash, metakaolin, perlite, rice hull hush, a swellable particulate elastomer, and any combination thereof.

6. The system of claim 5, wherein the at least one additive is present in an amount in a range of from about 0.1% to about 100% by weight of the pumice.

7. The system of claim 5, wherein the at least one additive present in an amount in a range of from about 50% to about 100% by weight of the pumice.

8. The system of claim 1, wherein the lightweight settable composition further comprises shale in an amount of about 40% to about 100% by weight of the pumice, and wherein the lightweight settable composition further comprises zeolite in an amount of about 40% to about 100% by weight of the pumice.

9. The system of claim 1, wherein the lightweight settable composition further comprises metakaolin in an amount of about 40% to about 100% by weight of the pumice.

10. The system of claim 1, wherein the lightweight settable composition is free of any additional cementitious components.

11. A remedial cementing system for cementing in a subterranean formation comprising:
a lightweight settable composition comprising pumice, a calcium activator in an amount of about 0.1% to about 25% by weight of the pumice, and water in an amount in a range of from about 40% to about 200% by weight of the pumice, wherein the lightweight settable composition has a density of less than about 13.5 pounds per gallon; wherein the lightweight settable composition is essentially free of any additional cementitious components; and wherein the lightweight settable composition is foamed with a foaming additive and a gas;
mixing equipment for mixing the lightweight settable composition; and
pumping equipment for delivering the lightweight settable composition into a void or crack in the subterranean formation, a gavel pack, a conduit, a cement sheath, or a microannulus.

12. The system of claim 11, wherein the calcium activator comprises a material selected from the group consisting of calcium formate, lime, hydrated lime, and any combination thereof.

13. The system of claim 11, wherein the lightweight settable composition further comprises at least one additive selected from the group consisting of shale, zeolite, amorphous silica, fly ash, metakaolin, perlite, rice hull hush, a swellable particulate elastomer, and any combination thereof.

14. The system of claim 11, wherein the lightweight settable composition further comprises shale in an amount of about 40% to about 100% by weight of the pumice, and wherein the lightweight settable composition further comprises zeolite in an amount of about 40% to about 100% by weight of the pumice.

15. The system of claim 11, wherein the mixing equipment is configured for mixing the pumice, calcium activator, and water; and wherein the pumping equipment is configured for pumping the lightweight settable composition through a pipe string in the well bore.

16. A remedial cementing system for cementing in a subterranean formation comprising:
a lightweight settable composition comprising pumice, a calcium activator in an amount of about 0.1% to about 25% by weight of the pumice, shale in an amount of about 40% to about 100% by weight of the pumice, zeolite in an amount of about 40% to about 100% by weight of the pumice, and water in an amount in a range of from about 40% to about 200% by weight of the pumice, wherein the lightweight settable composition has a density of less than about 13.5 pounds per gallon, wherein the lightweight settable composition is essentially free of any additional cementitious components, and wherein the composition is foamed using a foaming additive and a gas;
mixing equipment for mixing the lightweight settable composition; and pumping equipment for delivering the lightweight settable composition into a void or crack in the subterranean formation, a gravel pack, a conduit, a cement sheath, or a microannulus.

17. The system of claim 16, wherein the lightweight settable composition further comprises metakaolin in an amount of about 40% to about 100% by weight of the pumice.

18. The system of claim 16, wherein the lightweight settable composition further comprises at least one additive selected from the group consisting of amorphous silica, fly ash, metakaolin, perlite, rice hull hush, a swellable particulate elastomer, and any combination thereof.

* * * * *